United States Patent
Choi et al.

(10) Patent No.: US 12,474,508 B2
(45) Date of Patent: *Nov. 18, 2025

(54) OPTICAL MULTILAYER STRUCTURE, METHOD OF MANUFACTURING THE SAME, AND WINDOW COVER FILM INCLUDING THE SAME

(71) Applicants: SK INNOVATION CO., LTD., Seoul (KR); SK IE TECHNOLOGY CO., LTD., Seoul (KR)

(72) Inventors: Jeong Min Choi, Daejeon (KR); Kyu Seok Han, Daejeon (KR); Keon Hyeok Ko, Daejeon (KR); Sin Woo Kim, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 391 days.

This patent is subject to a terminal disclaimer.

(21) Appl. No.: 18/298,569

(22) Filed: Apr. 11, 2023

(65) Prior Publication Data

US 2023/0324585 A1    Oct. 12, 2023

(30) Foreign Application Priority Data

Apr. 11, 2022 (KR) .................. 10-2022-0044415

(51) Int. Cl.
G02B 1/18   (2015.01)
B32B 27/28  (2006.01)
G02B 1/14   (2015.01)

(52) U.S. Cl.
CPC .............. *G02B 1/18* (2015.01); *B32B 27/281* (2013.01); *B32B 27/283* (2013.01); *G02B 1/14* (2015.01)

(58) Field of Classification Search
CPC .......... G02B 1/18; G02B 1/14; B32B 27/281; B32B 27/283
See application file for complete search history.

(56) References Cited

U.S. PATENT DOCUMENTS

2020/0056056 A1 * 2/2020 Ahn ............... C09D 163/00
2020/0174161 A1 * 6/2020 Ahn ............... C08G 73/1078
2023/0323058 A1 * 10/2023 Han ..................... C08J 7/18

FOREIGN PATENT DOCUMENTS

| CN | 113568075 A | * 10/2021 | ......... H10K 59/8791 |
| KR | 10-1721563 B1 | 3/2017 | |
| KR | 10-2286194 B1 | 8/2021 | |
| KR | 10-2298174 B1 | 9/2021 | |

OTHER PUBLICATIONS

CN 113568075A machine translation (Year: 2021).*

* cited by examiner

*Primary Examiner* — Blaine Copenheaver
(74) *Attorney, Agent, or Firm* — IP & T GROUP LLP (57) ABSTRACT

An optical multilayer structure including a hard coating layer, an adhesion reinforcement layer, a low refractive layer, and a water repellent layer on a substrate layer. The optical multilayer structure includes a structure in which a hard coating layer, an adhesion reinforcement layer including an alkoxysilane-based compound having a functional group, a low refractive layer including a siloxane-based compound, and a water repellent layer including an alkoxysilane-based compound containing a fluorine atom are laminated on a substrate layer, thereby having both high wear resistance and water contact angle.

20 Claims, 1 Drawing Sheet

OPTICAL MULTILAYER STRUCTURE, METHOD OF MANUFACTURING THE SAME, AND WINDOW COVER FILM INCLUDING THE SAME

CROSS-REFERENCE TO RELATED APPLICATIONS

This application claims priority to Korean Patent Application No. 10-2022-0044415, filed Apr. 11, 2022. The entire contents of the above-listed application are hereby incorporated by reference for all purposes.

TECHNICAL FIELD

The following disclosure relates to an optical multilayer structure, a method of manufacturing the same, and a window cover film and a flexible display panel including the same.

BACKGROUND

Recently, thin display devices using flat panel display devices such as liquid crystal display devices or organic light emitting diode display devices are drawing a lot of attention. In particular, these thin displays are implemented in the form of a touch screen panel, and are widely used in various smart devices characterized by their portability including various wearable devices as well as smart phones and tablet PCs.

These portable touch screen panel-based displays are provided with a window cover for display protection on a display panel in order to protect the display panel from scratches or external impact, and in most cases, a tempered glass for a display is used as a window cover. The tempered glass for a display is characterized by being manufactured to be thinner than a regular glass, while having scratch resistance with high strength.

However, the tempered glass is unsuitable for weight reduction of portable devices due to its heavy weight, is vulnerable to external shock, so that it is difficult to implement a combined characteristic of being not easily breakable (unbreakable), and not bendable beyond a certain level, so that tempered glass is unsuitable as a flexible display material having a bendable or foldable function.

SUMMARY

In embodiment of the present disclosure is directed to providing an optical multilayer structure having low reflectance, and high wear resistance and water contact angle. Another embodiment of the present disclosure is directed to providing a method of manufacturing an optical multilayer structure having low reflectance, and a high wear resistance and a high water contact angle.

Another embodiment of the present disclosure is directed to providing a window cover film including the optical multilayer structure.

Still another embodiment of the present disclosure is directed to providing a flexible display panel including the window cover film.

In one general aspect, an optical multilayer structure of the present disclosure includes:
a substrate layer;
a hard coating layer formed on one surface of the substrate layer;
an adhesion reinforcement layer which is formed on the hard coating layer and includes an alkoxysilane-based compound having one or more functional groups;
a low refractive layer which is formed on the adhesion reinforcement layer and includes a siloxane-based compound; and
a water repellent layer which is formed on the low refractive layer and includes an alkoxysilane-based compound containing a fluorine atom,
wherein the optical multilayer structure has a reflectance of 4% or less.

In another general aspect of the present disclosure, a method of manufacturing an optical multilayer structure includes:
applying a composition for forming a hard coating layer on one surface of a substrate layer and curing the composition to form a hard coating layer;
applying a composition for forming an adhesion reinforcement layer including an alkoxysilane-based compound having one or more functional groups on the hard coating layer and drying the composition to form an adhesion reinforcement layer;
applying a composition for forming a low refractive layer including a siloxane-based compound on the adhesion reinforcement layer and drying the composition to form a low refractive layer; and
applying a composition for forming a water repellent layer including an alkoxysilane-based compound containing a fluorine atom on the low refractive layer and drying the composition to form a water repellent layer.

In another general aspect of the present disclosure, a window cover film includes the optical multilayer structure.

In still another general aspect of the present disclosure, a flexible display panel includes the window cover film.

Other features and aspects will be apparent from the following detailed description, the drawings, and the claims.

DETAILED DESCRIPTION OF MAIN ELEMENTS

100: optical multilayer structure
10: substrate layer
20: hard coating layer
30: adhesion reinforcement layer
40: low refractive layer
50: water repellent layer

DETAILED DESCRIPTION OF EMBODIMENTS

Hereinafter, an optical multilayer structure according to one embodiment, a method of manufacturing the same, a window cover film including the same, and a flexible display panel including the window cover film will be described in detail.

Herein, unless otherwise defined, all technical terms and scientific terms have the same meanings as those commonly understood by a person skilled in the art. The terms used in the description of the present specification are only for effectively describing certain specific examples, and are not intended to limit any of the disclosed embodiments. In addition, the singular form used in the specification and claims appended thereto may also include a plural form, unless otherwise indicated in the context.

Throughout the specification, unless explicitly described to the contrary, "comprising" any constituent elements will be understood to imply further inclusion of other constituent elements.

Hereinafter, unless otherwise defined in the present specification, it will be understood that when a part such as a layer, a film, a thin film, a region, or a plate is referred to as being "on" or "above" another part, it may include not only the case of being "directly on" the other part but also the case of having an intervening part therebetween.

Hereinafter, unless otherwise particularly defined in the present specification, the term "A and/or B" may refer to an embodiment including both A and B or an embodiment selecting one of A and B.

Hereinafter, unless otherwise defined in the present specification, a "polymer" may include an oligomer and a polymer, and may include a homopolymer and a copolymer. The copolymer may include an alternating polymer, a block copolymer, a random copolymer, a branched copolymer, a crosslinked copolymer, or all of these polymers.

Hereinafter, unless otherwise particularly defined, the term "flexible" may refer to warping, being bent, or being folded, Hereinafter, unless otherwise particularly defined in the present specification, "polyimide" includes an imide structure, and may be used in the meaning of including "polyimide" or "polyamideimide."

Hereinafter, unless otherwise particularly defined, any ranges described for the elements or properties thereof described herein include all intermediate values and all immediate ranges.

Hereinafter, unless otherwise particularly defined, terms such as "excellent", "high", "improved", and the like are relative terms indicating that the associated items are improved relative the same items in the prior art not having the attribute(s) of the invention(s) described herein.

Figure 1:
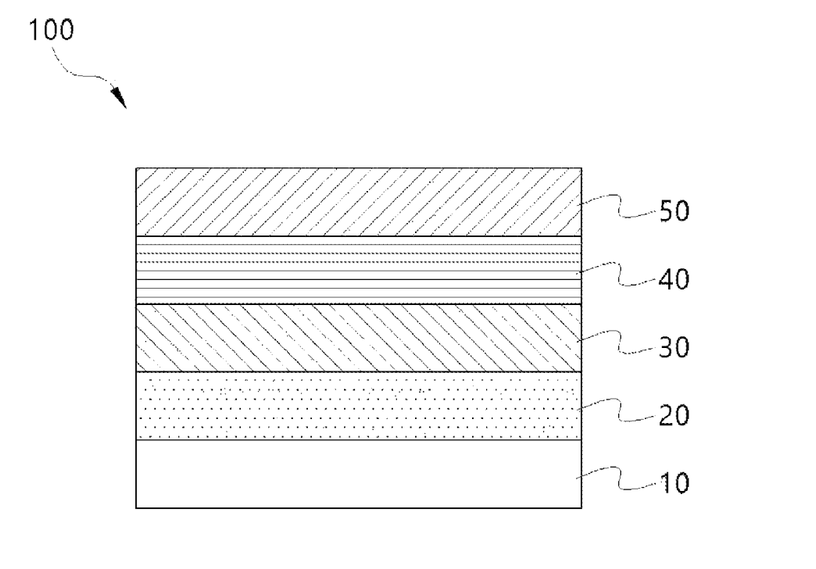
FIG. 1 shows a schematized structure of an optical multilayer structure according to one embodiment.

One embodiment of the present disclosure provides an optical multilayer structure 100 including as shown in FIG. 1:
- a substrate layer 10;
- a hard coating layer 20 formed on a first surface of the substrate layer 10;
- an adhesion reinforcement layer 30 formed on the hard coating layer and which includes an alkoxysilane-based compound having one or more functional groups;
- a low refractive layer 40 formed on the adhesion reinforcement layer and which includes a siloxane-based compound; and
- a water repellent layer 50 formed on the low refractive layer and which includes an alkoxysilane-based compound containing a fluorine atom.

In another embodiment, the substrate layer 10, the hard coating layer 20, the adhesion reinforcement layer 30, the low refractive layer 40, and the water repellent layer 50 may be laminated in order, and each layer may be laminated in direct contact with each other (or another layer may be formed between the layers).

Hereinafter, each component of the substrate layer 10, the hard coating layer 20, the adhesion reinforcement layer 30, low refractive layer 40, and the water repellent layer 50 included in the optical multilayer structure 100 according to various embodiments are described in more detail below without reference to the enumerations in FIG. 1.

<Substrate Layer>

In one embodiment, the substrate layer may be prepared from, for example, polyester-based resins such as for example polyethylene terephthalate, polyethylene isophthalate, and polybutylene terephthalate; cellulose-based resins such as for example diacetyl cellulose and triacetyl cellulose; polycarbonate-based resins; acrylic resins such as polymethyl (meth)acrylate and polyethyl (meth)acrylate; styrene-based resins such as for example a polystyrene acrylonitrile-styrene copolymer; polyolefin-based resin such as for example polyethylene, polypropylene, polyolefin-based resin having a cyclo-based or norbornene structure, and ethylenepropylene copolymer; polyimide-based resins; polyaramide-based resins; polyethersulfone-based resins; sulfone-based resins; and the like, and these resins may be used alone or in combination of two or more, but the present disclosure is not necessarily limited thereto. In another embodiment, the substrate layer may have improved transparency (or in general may be transparent), improved mechanical strength, improved in thermal stability, improved moisture shielding properties, improved isotropy, and the like.

In still another embodiment, the substrate layer may be a polyimide-based substrate layer formed of a polyimide-based resin including a chemical group derived from a fluorine-based aromatic diamine, in which the polyimide-based resin may include both a polyimide resin and a polyamideimide resin.

In another embodiment, the polyimide-based substrate layer includes a polyamideimide resin including an aliphatic cyclic structure and a fluorine atom, and as a specific example, may be a polyimide-based substrate layer including a chemical group derived from a fluorine-based aromatic diamine, an aromatic dianhydride, and an aromatic diacid dichloride, and as a more specific example, may be a polyimide-based substrate layer further including a chemical group derived from a cycloaliphatic dianhydride, but the present invention is not necessarily limited thereto.

In another embodiment, the substrate layer does not cause a rainbow phenomenon or a mura phenomenon, has improved optical properties, further lowers the haze of a window cover film, may further increase a total light transmittance, and may be characterized as transparent as opposed to opaque.

In one embodiment, the thickness of the substrate layer is not particularly limited, and for example, may be 10 μm to 150 μm, 10 μm to 100, 20 μm to 80 μm, 30 μm to 70 μm, or 40 μm to 60 μm, but the present invention is not necessarily limited thereto.

In another embodiment, the refractive index of the substrate layer may range from 1.4 to 1.8, 1.5 to 1.8, 1.5 to 1.7, or 1.6 to 1.8 (including intermediate values), but the present invention is not necessarily limited thereto.

<Hard Coating Layer>

In yet another embodiment, the hard coating layer may be formed on one or both surfaces (first and second surfaces) of the substrate layer, thereby protecting the substrate layer from external physical and chemical damage.

In still another embodiment, the hard coating layer may be formed by curing a composition for forming a hard coating layer, and also, may be a composite hard coating layer obtained by photocuring and then thermally curing the composition for forming a hard coating layer, but is not necessarily limited thereto.

In one embodiment, the hard coating layer may be formed by including a condensate of alkoxysilane having an epoxy group, and for example, the condensate of alkoxysilane having an epoxy group may be a siloxane resin including an epoxy group, but the present disclosure is not necessarily limited thereto. The condensate of alkoxysilane having an epoxy group may have improved hardness and bending properties when cured.

The epoxy group may be any one or more selected from a cyclic epoxy group, an aliphatic epoxy group, and an aromatic epoxy group, and the siloxane resin may refer to a polymer compound in which a silicon atom and an oxygen atom form a covalent bond.

In another embodiment, the condensate of alkoxysilane having an epoxy group may be a silsesquioxane resin having an epoxy group, and specifically, a silsesquioxane resin in which a silicon atom is directly substituted with an epoxy group or a substituent of the silicon atom is substituted with an epoxy group, and more specifically, the condensate of alkoxysilane having an epoxy group may be a silsesquioxane resin substituted with 2-(3,4-epoxycyclohexyl)ethyl group, but the present disclosure is not necessarily limited thereto.

In one embodiment, the condensate of alkoxysilane having an epoxy group may have a weight average molecular weight of 1,000 g/mol to 20,000 g/mol, 1,000 g/mol to 18,000 g/mol, or 2,000 g/mol to 15,000 g/mol. When the weight average molecular weight is in the described range, flowability, coatability, curing reactivity, and the like of the composition for forming a hard coating layer may be further improved.

In another embodiment, the condensate of alkoxysilane having an epoxy group may include a repeating unit derived from an alkoxysilane compound represented by the following Chemical Formula 1:

[Chemical Formula 1]

wherein $R^1$ is a straight-chain or branched-chain alkyl group having 1 to 6 carbon atoms substituted with an epoxycycloalkyl group having 3 to 6 carbon atoms or an oxiranyl group, in which the alkyl group may include an ether group, $R^2$ is a linear or branched alkyl group having 1 to 7 carbon atoms, and n is an integer of 1 to 3.

The alkoxysilane compound represented by Chemical Formula 1 may be, for example, 2-(3,4-epoxycyclohexyl)ethyltrimethoxysilane, 2-(3,4-epoxycyclohexyl)ethyltriethoxysilane, 3-glycidoxypropyltrimethoxysilane, and the like and may be used alone or in combination of two or more, but the present disclosure is not necessarily limited thereto.

In another embodiment, the condensate of alkoxysilane having an epoxy group may be included at 20 parts by weight to 70 parts by weight or 20 parts by weight to 50 parts by weight with respect to 100 parts by weight of the composition for forming a hard coating layer, but the present disclosure is not necessarily limited thereof.

In still another embodiment, the composition for forming a hard coating layer may have improved flowability and coatability, may be uniformly cured during the curing of the composition for forming a hard coating layer to allow effective prevention of physical defects such as cracks by overcuring, and may show improved hardness.

In one embodiment, the hard coating layer may be formed by further including a crosslinking agent having a polyfunctional epoxy group. Herein, the crosslinking agent may include a compound having an alicyclic epoxy group, and for example, the crosslinking agent may include a compound in which two 3,4-epoxycyclohexyl groups are linked, but is not necessarily limited thereto. The crosslinking agent may have a structure and properties similar to the condensate of alkoxysilane having an epoxy group, and in this case, may promote crosslinking of the condensate of alkoxysilane having an epoxy group.

In another embodiment, the hard coating layer may have a thickness of 1 μm to 100 μm, 1 μm to 80 μm, 1 μm to 50 μm, 1 μm to 30 μm, 1 μm to 20 μm, or 1 μm to 10 μm, but the present disclosure is not necessarily limited thereto.

In still another embodiment, the hard coating layer may have a refractive index ranging from 1.50 to 1.54, 1.51 to 1.53, or 1.52 to 1.53, but the present disclosure is not necessarily limited thereto.

Hereinafter, a method of forming a hard coating layer will be described. While the following describes how the hard coating layer is prepared, the present disclosure is not necessarily limited to the details in this description.

The hard coating layer is formed by preparing a composition for forming a hard coating layer, applying the composition on a substrate layer, and curing the composition.

In one embodiment, the composition for forming a hard coating layer may include a condensate of alkoxysilane having an epoxy group, in which the condensate of alkoxysilane having an epoxy group may be the same as those described above for the hard coating layer.

In another embodiment, the composition for forming a hard coating layer may further include a photoinitiator and a thermal initiator including a compound represented by the following Chemical Formula 2:

[Chemical Formula 2]

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independent of each other hydrogen, a halogen, or an alkyl group having 1 to 4 carbon atoms, n is 1 to 4, $R^5$ is an alkyl group having 1 to 4 carbon atoms or an aralkyl group having 7 to 15 carbon atoms which may be substituted with an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxycarbonyl group has alkoxy portion having 1 to 4 carbon atoms, and for example, may be a methoxycarbonyl group, an ethoxycarbonyl group, a propoxycarbonyl group, and the like.

The alkylcarbonyl group has an alkyl portion having 1 to 4 carbon atoms, and for example, may be an acetyl group, a propionyl group, and the like.

The arylcarbonyl group has an aryl portion having 6 to 14 carbon atoms, and for example, may be a benzoyl group, a 1-naphthylcarbonyl group, a 2-naphthylcarbonyl group, and the like.

An aralkyl group may be, for example, a benzyl group, a 2-phenylethyl group, a 1-naphthylmethyl group, a 2-naphthylmethyl group, and the like.

When the compound of Chemical Formula 2 is used as a thermal initiator, a cure half-life may be shortened, and thermal curing may be performed even in low-temperature conditions, and thus, damage and deformation due to a long-term heat treatment under high-temperature conditions may be prevented.

The thermal initiator may promote the crosslinking reaction of the epoxy siloxane resin or the crosslinking agent described later when heat is applied to the composition for forming a hard coating layer. As the thermal initiator, a cationic thermal initiator may be used, but the present disclosure is not necessarily limited thereto.

In addition, by using photocuring using the photoinitiator in combination with the thermal curing using the thermal initiator, the curing degree, the hardness, the flexibility, and the like of the hard coating layer may be improved. For example, the composition for forming a hard coating layer is applied to a substrate e.g., a flexible glass or flexible plastic substrate) or the like and irradiated with ultraviolet rays (photocuring) to at least partially cure the composition, and then heat is further applied (thermal curing), thereby performing substantially a complete curing.

In one embodiment, the composition for forming a hard coating layer may be semi-cured or partially cured by the photocuring, and the semi-cured or partially cured composition for forming a hard coating layer may be substantially completely cured by the thermal curing.

For example, when the composition for forming a hard coating layer is cured only by the photocuring, a curing time may be excessively extended or curing may not be completely performed in some parts. However, when the photocuring is followed by the thermal curing, the portion which is not cured by the photocuring may be substantially completely cured by the thermal curing, and the curing time may be also reduced.

In addition, in general, a portion which has been already appropriately cured is provided with excessive energy due to an increased curing time (for example, an increased light exposure time), which may cause overcuring. When the overcuring proceeds, the hard coating layer loses flexibility and/or mechanical defects such as curls or cracks may occur. However, the photocuring and the thermal curing are used in combination, the composition for forming a hard coating layer may be substantially completely cured within a relatively short time, and the hardness of the hard coating layer may be further increased while the flexibility of the hard coating layer is maintained.

Though the method of first photocuring and then further thermally curing the composition for forming a hard coating layer has been described above, the sequence of the photocuring and the thermal curing is not particularly limited thereto. That is, in some embodiments, the thermal curing may be first performed and then the photocuring may be performed, and vice versa.

In one embodiment, the thermal initiator may be included at 0.1 parts by weight to 20 parts by weight or 1 part by weight to 20 parts by weight with respect to 100 parts by weight of the condensate of alkoxysilane having an epoxy group, but the present invention is not necessarily limited thereto.

In addition, for example, the thermal initiator may be included at 0.01 parts by weight to 15 parts by weight, 0.1 parts by weight to 15 parts by weight, or 0.3 parts by weight to 10 parts by weight with respect to a total of 100 parts by weight of the composition for forming a hard coating layer, but the present disclosure is not necessarily limited thereto.

In another embodiment, the photoinitiator may include a photocationic initiator. The photocationic initiator may initiate polymerization of the epoxy siloxane resin and an epoxy-based monomer.

As the photocationic initiator, an onium salt and/or an organometal salt, and the like may be used, and for example, a diaryliodonium salt, a triarylsulfonium salt, an aryldiazonium salt, an iron-arene composite, and the like may be used alone or in combination of two or more, but the present disclosure is not necessarily limited thereto.

The content of the photoinitiator is not particularly limited, but for example, the photoinitiator may be included at 0.1 parts by weight to 15 parts by weight or 1 part by weight to 15 parts by weight with respect to 100 parts by weight of the condensate of alkoxysilane having an epoxy group, but the present disclosure is not necessarily limited thereto.

In addition, for example, the photoinitiator may be included at 0.01 parts by weight to 10 parts by weight, 0.1 parts by weight to 10 parts by weight, or 0.3 parts by weight to 5 parts by weight with respect to a total of 100 parts by weight of the composition for forming a hard coating layer, but the present disclosure is not necessarily limited thereto.

In another embodiment, the composition for forming a hard coating layer may further include a crosslinking agent. For example, the crosslinking agent may form crosslinks with the condensate of alkoxysilane having an epoxy group to solidify the composition for forming a hard coating layer and increase the hardness of the hard coating layer.

In one embodiment, the crosslinking agent may include a compound having an alicyclic epoxy group. For example, the crosslinking agent may include a compound in which two 3,4-epoxycyclohexyl groups are linked to each other, but the present disclosure is not necessarily limited thereto. The crosslinking agent may have a structure and properties similar to the condensate of alkoxysilane having an epoxy group, and in this case, the crosslinking agent may promote the crosslinks of the condensate of alkoxysilane having an epoxy group while maintaining an appropriate viscosity of the composition.

In another embodiment, the crosslinking agent may be included at 5 parts by weight to 150 parts by weight with respect to 100 parts by weight of the condensate of alkoxysilane having an epoxy group, but the present disclosure is not necessarily limited thereto. The viscosity of the composition may be maintained in an appropriate range by the crosslinking agent, and applicability and curing reactivity may be improved.

In addition, for example, the crosslinking agent may be included at 1 part by weight to 30 parts by weight or 5 parts by weight to 20 parts by weight with respect to a total of 100 parts by weight of the composition for forming a hard coating layer, but the present disclosure is not necessarily limited thereto.

In one embodiment, the composition for forming a hard coating layer may further include a thermal curing agent.

The thermal curing agent may include amine-based, imidazole-based, acid anhydride-based, and amide-based thermal curing agents, and the like, and these may be used alone or in combination of two or more, but the present disclosure is not necessarily limited thereto.

In one embodiment, the thermal curing agent may be included at 5 parts by weight to 30 parts by weight with respect to 100 parts by weight of the condensate of alkoxysilane having an epoxy group, but the present disclosure is not necessarily limited thereto. The curing efficiency of the composition for forming a hard coating layer may be further improved by the thermal curing agent to form a hard coating layer having relatively better hardness.

In another embodiment, the composition for forming a hard coating layer may further include a solvent. The solvent is not particularly limited and may be a solvent known in the art.

Non-limiting example of the solvent may include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 parts by weight to 200 parts by weight with respect to 100 parts by weight of the condensate of alkoxysilane having an epoxy group. When the solvent is used, the composition for forming a hard coating layer may secure an appropriate level of viscosity, and thus, workability during formation of the hard coating layer may be better. In addition, it is relatively easy to adjust the thickness of the hard coating layer, and a solvent drying time is reduced, whereby a more rapid process speed may be secured.

In still another embodiment, the solvent may be included in a residual amount excluding the amount of the remaining components in the total weight of a predetermined entire composition. For example, when the total weight of the predetermined entire composition is 100 g and the sum of the weights of the components other than the solvent is 70 g, the solvent may be included at 30 g, but the present disclosure is not necessarily limited thereto.

In one embodiment, the composition for forming a hard coating layer may further include an inorganic filler. The inorganic filler may further increase the hardness of the hard coating layer.

The inorganic filler is not particularly limited, and an example thereof may include metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, or in terms of compatibility with other components of the composition for forming a hard coating layer, silica may be used, and these inorganic fillers may be used alone or in combination of two or more, but the present disclosure is not necessarily limited thereto.

In still another embodiment, the composition for forming a hard coating layer may further include a lubricant. The lubricant may further improve winding efficiency, blocking resistance, wear resistance, scratch resistance, and the like.

The kind of lubricant is not particularly limited, and for example, waxes such as polyethylene wax, paraffin wax, synthetic wax, or montan wax; synthetic resins such as silicon-based resins and fluorine-based resins; and the like may be used, and these lubricants may be used alone or in combination of two or more, but the present disclosure is not necessarily limited.

In one embodiment, the composition for forming a hard coating layer may further include additives such as, for example, an antioxidant, a UV absorber, a photostabilizer, a thermal polymerization inhibitor, a leveling agent, a surfactant, a lubricant, and an antifouling agent.

<Adhesion Reinforcement Layer>

In one embodiment, the adhesion reinforcement layer may be formed on the hard coating layer, and for example, the adhesion reinforcement layer may be formed in contact with the upper surface of the hard coating layer.

In another embodiment, the adhesion reinforcement layer may be formed by including an alkoxysilane-based compound having one or more functional groups. The alkoxysilane-based compound having one or more functional groups is an alkoxysilane-based compound substituted with one or two or more functional groups, and for example, a silicon atom of the alkoxysilane-based compound may be directly substituted with the functional group or a substituent substituted on a silicon atom (for example, an alkyl group) or the like may be substituted with the functional group. That is to say, an alkyl group substituted with one or two or more functional groups may be linked to a silicon atom, but the present disclosure is not necessarily limited thereto.

In still another embodiment, the functional group may be an organofunctional group, and for example, the organofunctional group may be any one selected from an amino group, an amide group, a carboxyl group, an ester group, an acryl group, an epoxy group, an isocyanate group, and the like, or a combination thereof, but the present disclosure is not necessarily limited thereto.

Since an alkoxysilane-based compound having an organofunctional group has both an alkoxysilane group which reacts with an inorganic material and an organofunctional group forming a chemical bond with an organic material in the molecule, it has an improved ability to combine an organic material and an inorganic material and may decrease the surface energy of an organic material to further increase adhesive strength with an inorganic material. In addition, the alkoxysilane-based compound having an organofunctional group may increase compatibility with other resins.

Therefore, when the alkoxysilane-based compound having one or more functional groups included in the adhesion reinforcement layer has both the organofunctional group and an alkoxysilane group, the alkoxysilane-based compound included in the adhesion reinforcement layer may form a chemical bond with both the condensate of alkoxysilane having an epoxy group of the hard coating layer and the fluorine-containing alkoxysilane-based compound of the water repellent layer. In addition, when the adhesion reinforcement layer is formed between the hard coating layer and the low refractive layer, a binding force between each layer is further improved, so that each layer may be substantially integrated.

In one embodiment, when the adhesion reinforcement layer is formed between the hard coating layer and the low refractive layer, a binding force between each layer of the optical multilayer structure is significantly improved, and high wear resistance and water contact angle properties may be implemented.

In another embodiment, a commercialized example of the alkoxysilane-based compound having one or more functional groups may include KBM-402, KBM-603, KBM-903, KBM-802, and the like available from Shin-etsu, but these alkoxysilane-based compounds are only non-limiting examples, and the present disclosure is not necessarily limited.

In one embodiment, the adhesion reinforcement layer is included between the hard coating layer and the low refractive layer, thereby significantly increasing the initial water contact angle of the water repellent layer and improving wear resistance.

In another embodiment, the thickness of the adhesion reinforcement layer is not particularly limited, and for example, may range from 5 nm to 100 nm, 10 nm to 70 nm, or nm to 50 nm, but the present disclosure is not necessarily limited thereto.

In still another embodiment, the refractive index of the adhesion reinforcement layer may range from 1.48 to 1.53, 1.49 to 1.53, 1.50 to 1.53, or 1.51 to 1.53, but the present disclosure is not necessarily limited thereto.

Hereinafter, a method of forming an adhesion reinforcement layer will be described.

The adhesion reinforcement layer is formed by preparing a composition for forming an adhesion reinforcement layer, applying the composition on the hard coating layer, and drying the composition.

In one embodiment, the composition for forming an adhesion reinforcement layer may include an alkoxysilane-based compound having one or more functional groups, in which the alkoxysilane-based compound having one or more functional groups may be those as described above for the adhesion reinforcement layer.

In another embodiment, the composition for forming an adhesion reinforcement layer may further include a solvent. The solvent is not particularly limited and a solvent known in the art may be used.

Non-limiting examples of the solvents include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), and the like. These solvents may be used alone or in combination of two or more.

<Low Refractive Layer>

In one embodiment, the low refractive layer may be formed on the adhesion reinforcement layer, and for example, the low refractive layer may be formed in contact with the upper surface of the adhesion reinforcement layer.

In another embodiment, the low refractive layer may include a siloxane-based compound, and the siloxane-based compound may be, for example, a compound represented by Chemical Formula 3 or a polymer thereof.

$$Si(OR^7)_a(R^8)_{4-a}$$ [Chemical Formula 3]

wherein $R^7$ and $R^8$ are independent of each other hydrogen, a straight-chain or branched-chain alkyl group having 1 to carbon atoms, a straight-chain or branched-chain alkenyl group having 1 to 20 carbon atoms, or a straight-chain or branched-chain alkynyl group having 1 to 20 carbon atoms, in which the number of carbons may be 1 to 15, 1 to 10, 1 to 5, or 1 to 3 carbon atoms, and a is an integer of 1 to 4.

In one embodiment, the siloxane-based compound may be tetraethyl orthosilicate (TEOS), tetramethyl orthosilicate (TMOS), tetrapropyl orthosilicate (TPOS), tetrabutyl orothosilicate (TBOS), or a copolymer thereof.

In another embodiment, the low refractive layer is included between the adhesion reinforcement layer and the water repellent layer, thereby implementing the low reflectance and high transmittance of the film.

In another embodiment, the thickness of the low refractive layer is not particularly limited, and for example, may range from 50 nm to 150 nm, 60 nm to 120 nm, or 80 nm to 100 nm, but the present invention is not necessarily limited thereto.

In one embodiment, the refractive index of the low refractive layer may range from 1.42 to 1.47, 1.43 to 1.47, 1.44 to 1.46, 1.43 to 1.46, or 1.44 to 1.45, but the present disclosure is not necessarily limited thereto.

Hereinafter, a method of forming a low refractive layer will be described.

The low refractive layer may be formed by preparing a composition for forming a low refractive layer, applying the composition on the adhesion reinforcement layer, and drying the composition.

In another embodiment, the composition for forming a low refractive layer may include a siloxane-based compound, in which the siloxane-based compound may be the same as those described for the low refractive layer.

<Water Repellent Layer>

In one embodiment, the water repellent layer may be formed on the low refractive layer, and for example, the water repellent layer may be formed in contact with the upper surface of the low refractive layer.

In another embodiment, the water repellent layer may be formed by including an alkoxysilane-based compound containing a fluorine atom. In the alkoxysilane-based compound containing a fluorine atom, for example, a silicon atom of the alkoxysilane-based compound may be directly substituted with fluorine or a substituent (for example, an alkyl group) or the like substituted on a silicon atom may be substituted with fluorine. That is to say, an alkyl group substituted with fluorine may be linked to a silicon atom, but the present disclosure is not necessarily limited thereto.

More specifically, in another embodiment, the alkoxysilane-based compound containing a fluorine atom may have a perfluoropolyether group in a molecular main chain and a hydrolyzable reactive group bonded to a silicon atom at the end, but the present disclosure is not necessarily limited thereto. In this case, the hydrolyzable reactive group may form a chemical bond with a reactive group of the low refractive layer by a hydrolysis reaction, a condensation reaction, or the like, thereby further improving an interlayer binding force, and a fluorine functional group may be oriented on the upper surface layer of the water repellent layer to further improve an antifouling property, water repellency, oil repellency, and the like.

In still another embodiment, the perfluoropolyether group may include a perfluorinated repeating unit selected from —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, or a combination thereof, and the like, may be linear, branched, cyclic, or a combination thereof, and may be saturated or unsaturated, but is not necessarily limited thereto.

In the repeating unit, p may be an integer of 1 to 10, specifically an integer of 1 to 4, more specifically an integer of 1 or 2, but is not necessarily limited thereto.

In addition, the Z group may be any one or more selected from a fluorine group, a perfluoroalkyl group, a perfluoroether group, a nitrogen-containing perfluoroalkyl group, a perfluoropolyether group, a perfluoroalkoxy group, and the like, which may be all linear, branched, or cyclic, but the present disclosure is not necessarily limited thereto.

In addition, in the perfluoropolyether group, the number of the repeating units may be, independent of each other, 0 to 200, specifically 1 to 200, and the sum of the number of the repeating units may be at least one, 20 to 100, or 30 to 50, but the present disclosure is not necessarily limited thereto, and in the perfluoropolyether group, the order of the repeating units may be arbitrary, which is not particularly limited.

A commercialized example of the alkoxysilane-based compound containing a fluorine atom may include KY-1901, KY-1905, and KY-19012 available from Shin-etsu, Optool DSX, UD120, and the like available from Daikin, and the like, but these alkoxysilane-based compounds containing a fluorine atom are only non-limiting examples, and the present disclosure is not necessarily limited.

When the water repellent layer formed by including an alkoxysilane-based compound containing a fluorine atom is formed on the low refractive layer including a siloxane-based compound, an interlayer binding force by a chemical bond between the water repellent layer and the low refractive layer may be further improved, due to a similar chemical structure between compounds included in the water repellent layer and the low refractive layer.

In addition, the alkoxysilane-based compound containing a fluorine atom may impart improved water repellent, waterproof, and oil repellent functions to the water repellent layer. Therefore, the water repellent layer formed by including the alkoxysilane-based compound containing a fluorine atom may show improved water repellent properties.

In another embodiment, the water repellent layer may have a water contact angle of 105° or more, 109° or more, 110° or more, 112° or more, 105° to 120°, 110° to 120°, or 110° to 115°, and may have characteristics such as improved hardness, improved wear resistance, improved scratch resistance, and improved fingerprint wiping ability.

In another embodiment, the thickness of the water repellent layer is not particularly limited, and for example, may range from 5 nm to 100 nm, 10 nm to 70 nm, or 10 nm to 50 nm, but the present disclosure is not necessarily limited thereto.

Hereinafter, a method of forming a water repellent layer will be described.

The water repellent layer may be formed by preparing a composition for forming a water repellent layer, applying the composition on the low refractive layer, and drying the composition.

In one embodiment, the composition for forming a water repellent layer may include a fluorine-containing alkoxysilane-based compound, in which the fluorine-containing alkoxysilane-based compound may be the same as those described above for the water repellent layer.

In another embodiment, the composition for forming a water repellent layer may include a solvent, and the solvent may be any one selected from hexafluoroxylene, hydrofluorocarbon, hydrofluoroether, and the like or a combination of two or more thereof and a commercialized example of the solvent may include HFE-7500, 7200, 7100, and Novec 7500 available from 3M, Vertrel XF available from DuPont, ZEORORA H available from Nippon Zeon, and the like, but these solvents are only non-limiting examples, and the present disclosure is not necessarily limited.

In still another embodiment, the water repellent layer may be formed by thermally curing the applied composition for forming a water repellent layer. When the water repellent layer is cured, not by photocuring, but by thermal curing, the hard coating layer and the adhesion reinforcement layer on a lower surface of the water repellent layer may be prevented from being exposed to active energy rays (for example, ultraviolet rays) again, and in particular, the cured hard coating layer may be prevented from being exposed to light again to cause overcuring or yellowing.

In yet another embodiment, the thermal curing may be performed by drying at a temperature of 50° C. to 200° C. for 3 minutes to 30 minutes or at a temperature of 50° C. to 100° C. for 3 minutes to 10 minutes and then a heat treatment at a temperature of 50° C. to 200° C. for 3 minutes to 30 minutes or at a temperature of 80° C. to 150° C. for 3 minutes to 20 minutes, but the present disclosure is not necessarily limited thereto. In the above temperature range, the composition for forming a water repellent layer may be cured at a more effective rate, and occurrence of a side reaction between each component in the composition may be effectively prevented.

In one embodiment, the optical multilayer structure may have a reflectance of 4% or less, 3.5% or less, 3% or less, 2.8% or less, 0.5% to 4%, 1% to 4%, 2% to 3.5%, 2.5% to 4%, or 2% to 4%. Herein, the reflectance may be measured using a spectrophotometer (Hunterlab, ColorQuest XE) in accordance with the specification of ASTM E1164.

In another embodiment, the optical multilayer structure may satisfy the following Equation 1:

$$25\% \geq \Delta E = (E0 - E1/E0) \times 100 \qquad \text{[Equation 1]}$$

wherein E0 is a water contact angle of the water repellent layer, and E1 is a water contact angle of the water repellent layer after applying a load of about 500 g to a Minoan rubber stick having a diameter of 3 mm to 5 mm or 4 mm and rubbing the rubber stick about 2000 times reciprocatingly over a distance of about 15 mm at a speed of about 50 rpm on a surface of the water repellent layer.

In still another embodiment, a refractive index difference between each layer may be adjusted to adjust the reflectance of the optical multilayer structure. For example, the optical multilayer structure may satisfy the following Equation 2, Equation 3, Equation 4, and/or Equation 5:

$$-0.05 \leq nf - n0 \leq 0.15 \qquad \text{[Equation 2]}$$

$$0.001 \leq n0 - n1 \leq 0.008 \qquad \text{[Equation 3]}$$

$$0.05 \leq n0 - n2 \leq 0.1 \qquad \text{[Equation 4]}$$

$$0.05 \leq n1 - n2 \leq 0.1 \qquad \text{[Equation 5]}$$

wherein of is a refractive index of the substrate layer, n0 is a refractive index of the hard coating layer, n1 is a refractive index of the adhesion reinforcement layer, and n2 is a refractive index of the low refractive layer.

However, the present disclosure is not limited to the ranges according to Equations 2 to 5, and for example, Equation 2 may be $0 \leq nf - n0 \leq 0.15$, $0.05 \leq nf - n0 \leq 0.15$, $0.07 \leq nf - n0 \leq 0.13$, $0.08 \leq nf - n0 \leq 0.12$, or $0.09 \leq nf - n0 \leq 0.11$; Equation 3 may be $0.002 \leq n0 - n1 \leq 0.006$, $0.003 \leq n0 - n1 \leq 0.006$, or $0.003 \leq n0 - n1 \leq 0.005$; Equation 4 may be $0.06 \leq n0 - n2 \leq 0.09$, $0.065 \leq n0 - n2 \leq 0.085$, or $0.07 \leq n0 - n2 \leq 0.08$; and Equation 5 may be $0.05 \leq n1 - n2 \leq 0.09$, $0.05 \leq n1 - n2 \leq 0.08$, or $0.05 \leq n1 - n2 \leq 0.075$.

In one embodiment, the optical multilayer structure may further include a hard coating layer formed on the other surface of the substrate.

In another embodiment, a thickness ratio between the adhesion reinforcement layer and the low refractive layer may be 1:2 to 1:7, 1:2 to 1:6, 1:2 to 1:5, 1:2 to 1:4, 1:2.5 to 1:1.35, or 1:3, but the present disclosure is not necessarily limited thereto.

<Method of Manufacturing Optical Multilayer Structure>

One embodiment of the present disclosure provides a method of manufacturing the optical multilayer structure described above.

In one embodiment, the method of manufacturing an optical multilayer structure may include:

applying a composition for forming a hard coating layer on one surface of a substrate layer and curing the composition to form a hard coating layer;

applying a composition for forming an adhesion reinforcement layer including an alkoxysilane-based compound having one or more functional groups on the hard coating layer and drying the composition to form an adhesion reinforcement layer;

applying a composition for forming a low refractive layer including a siloxane-based compound on the adhesion reinforcement layer and drying the composition to form a low refractive layer; and applying a composition for forming a water repellent layer including an alkoxysilane-based compound containing a fluorine atom on the low refractive layer and drying the composition to form a water repellent layer.

In another embodiment, the method of manufacturing an optical multilayer structure may further include applying the composition for forming a hard coating layer on the other surface of the substrate layer and curing the composition to form a hard coating layer.

In another embodiment, the above descriptions of the optical multilayer structure may apply to the method of manufacturing an optical multilayer structure.

In still another embodiment, the application may be performed by a die coater, an air knife, a reverse roll, a spray, a blade, casting, gravure, spin coating, and the like, but the present disclosure is not necessarily limited thereto.

In another embodiment, the step of forming a hard coating layer may be photocuring followed by thermal curing of the composition for forming a hard coating layer, but is not necessarily limited thereto. Herein, the thermal curing may be performed at a temperature of 100 to 200° C. for 5 to 20 minutes, but the present disclosure is not necessarily limited thereto. In another embodiment, a step of pretreatment by heating composition for forming a hard coating layer before the photocuring may be further included, and the pretreatment may be performed at a temperature lower than the thermal curing temperature, but the present disclosure is not necessarily limited thereto.

In yet another embodiment, the step of drying the composition for forming an adhesion reinforcement layer may be drying the composition for forming an adhesion reinforcement layer at 0° C. to 50° C., 10° C. to 50° C., 20° C. to 50° C., or 30° C. to 50° C. for 1 minute to 30 minutes, 1 minute to 20 minutes, or 1 minute to 10 minutes, but the present disclosure is not necessarily limited thereto.

In another 4 embodiment, the step of curing the composition for forming a water repellent layer may include drying the composition for forming a water repellent layer at a temperature of 50° C. to 200° C. for 3 minutes to 30 minutes or at a temperature of 50° C. to 100° C. for 3 minutes to 10 minutes and then heat treating at a temperature of 50° C. to 200° C. for 3 minutes to 30 minutes or at a temperature of 80° C. to 150° C. for 3 minutes to 20 minutes, but the present disclosure is not necessarily limited thereto.

<Window Cover Film and Flexible Display Panel>

Another embodiment of the present disclosure may provide a window cover film including the optical multilayer structure, and still another embodiment of the present disclosure may provide a flexible display panel or a flexible display device including the window cover film.

Since the optical multilayer structure according to one embodiment may have low reflectance and improved water contact angle and wear resistance, it may be effectively applied to the window cover film and/or the flexible display panel.

The window cover film may be used as an outermost window substrate of a flexible display device. The flexible display device may be various image display devices such as for example a common liquid crystal display device, an electroluminescent display device, a plasma display device, and a field emission display device.

Hereinafter, the examples and the experimental examples of one embodiment will be specifically illustrated. However, the examples and the experimental examples described later are only illustrative of various embodiments, and the present disclosure is not limited thereto.

<Test Method>

1. Refractive Index

An optical multilayer structure was cut into a size of 3 cm×4 cm in the longitudinal direction (MD) and a width direction (TD). A refractive index in a length direction ($R_x$) and a refractive index in a width direction (Ry) thereof were measured at a wavelength of 543 nm using Prism coupler (Meticon, 2010/M) with TE mode. The refractive index (R) of a specimen was calculated by averaging the refractive indexes in length and width directions.

2. Water Contact Angle

The water contact angle of an optical multilayer structure was measured using a water contact angle meter (Kruss, DSA) in accordance with the specification of ASTM D5946.

3. Water Contact Angle after Abrasion with Rubber Stick

An optical multilayer structure was cut into 7 cm×12 cm and fixed to a jig of a wear resistance meter (Kipae E&T Co., Ltd., scratch tester), and a rubber stick having a diameter of 4 mm (Minoan) was mounted and fixed to the tip. The rubber stick set with a moving distance of 15 mm, a moving speed of 50 rpm, and a load of 500 g was rubbed 2000 times reciprocatingly on the surface of a water repellent layer, and the water contact angle of the worn surface was measured in accordance with the measurement method described in 2. Water contact angle above.

4. Transmittance

The transmittance of an optical multilayer structure was measured using equipment available from Nippon Denshoku.

5. Reflectance

An optical multilayer structure was cut into 5 cm×7 cm in the longitudinal direction (MD) and the width direction (TD), and Black PET(polyethylene therphthalate) from Tomoegawa for back surface reflected light absorption was laminated on the rear surface to manufacture a specimen. The reflectance of the manufactured specimen was measured using a spectrophotometer (Hunterlab, ColorQuest XE) in accordance with the specification of ASTM E1164.

Example 1

1-1. Preparation of Composition for Forming Substrate Layer

In a reactor under a nitrogen atmosphere, terephthaloyl dichloride (TPC) and 2,2'-bis(trifluoromethyl)-benzidine (TFMB) were added to a mixed solution of dichloromethane and pyridine, and stirring was performed at 25° C. for 2 hours under a nitrogen atmosphere. At this time, TPC and TFMB were added at a mole ratio of 3:4 and the solid content was adjusted to 10 wt % to perform polymerization. Thereafter, the product was precipitated in an excessive amount of methanol and filtered to obtain a solid content, which was dried under vacuum at 50° C. for 6 hours or more to obtain an oligomer, and the prepared oligomer had a formula weight (FW) of 1670 g/mol.

N,N-dimethylacetamide (DMAc) as a solvent, 100 mol of the oligomer, and 28.6 mol of 2,2'-bis(trifluoromethyl)-benzidine (TFMB) were added to the reactor and sufficient stirring was performed. Thereafter, 64.3 mol of cyclobutanetetracarboxylic dianhydride (CBDA) and 64.3 mol of 4,4'-hexafluoroisopropylidene diphthalic dianhydride (6FDA) were added to the reactor, and polymerization was performed at 40° C. for 10 hours with sufficient stirring. At this time, the solid content of the reaction solution was 20 wt %. Subsequently, pyridine and an acetic acid anhydride were sequentially added 2.5 times the moles of the total content of the dianhydride, respectively, and stirring was performed at 60° C. for 12 hours.

After the polymerization was completed, the polymerization solution was precipitated in an excessive amount of methanol and filtered to obtain a solid content, which was dried under vacuum at 50° C. for 6 hours or more, thereby obtaining polyamideimide powder. The powder was diluted and dissolved at 20 wt % in DMAc to prepare a composition for forming a substrate layer.

1-2. Preparation of Composition for Forming Hard Coating Layer 2-(3,4-epoxycyclohexyl)ethyltrimethoxysilane (ECTMS, TCI) and water were mixed at a ratio of 24.64 g:2.70 g (0.1 mol: 0.15 mol) to prepare a reaction solution, which was added to a 250 mL 2-neck flask. 0.1 mL of a tetramethylammonium hydroxide catalyst (Aldrich) and 100 mL of tetrahydrofuran (Aldrich) were added to the mixture and stirring was performed at 25° C. for 36 hours.

Thereafter, layer separation was performed, a product layer was extracted with methylene chloride (Aldrich), moisture was removed from the extract with magnesium sulfate (Aldrich), and the solvent was dried under vacuum to obtain an epoxy siloxane-based resin. The weight average molecular weight of the epoxy siloxane-based resin was measured using gel permeation chromatography (GPC), and the result was 2,500 g/mol.

30 g of the epoxy siloxane-based resin as prepared above, 10 g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl)[4-(2-methylpropyl)phenyl]iodoniumhexafluorophosphate as a photoinitiator, and 54.5 g of methylethyl ketone were mixed to prepare a composition for forming a hard coating layer.

1-3. Preparation of Composition for Forming Adhesion Reinforcement Layer

An alkoxysilane-based compound containing an amino group and an alkoxysilane group (KBM-603 available from Shin-etsu) was diluted with an isopropyl alcohol (IPA) solution so that a solid content was 0.15 wt o, thereby preparing a composition for forming an adhesion reinforcement layer.

1-4. Preparation of Composition for Forming Low Refractive Layer 4.0 g (19 mmol) of tetraethyl orthosilicate (TEOS), 4.0 g (67 mmol) of 2-propanol, 1.98 g (110 mmol) of distilled water, and 0.016 g (0.16 mmol) of 95% sulfuric acid were sequentially added to a 20 mL vial, heated to 40° C., and stirred for 1 hour. Thereafter, the temperature was cooled to room temperature, sulfuric acid was removed using an anion exchange resin, and the product was added to a 250 mL round bottom flask. Next, 110 g (1.83 mol) of 2-propanol and 1.2 mg (0.017 mmol) of sodium nitrite were added to the flask, the temperature was heated to 60° C., stirring was performed for 2 hours, and the temperature was cooled to room temperature to prepare the composition for forming a low refractive layer.

1-5. Preparation of Composition for Forming Water Repellent Layer

An alkoxysilane-based compound containing a perfluorinated group and an alkoxysilane group (Optool available from Daikin) was diluted with a fluorine-based solvent (Novec 7500 available from 3M) at a concentration of 0.1 wt % of a solid content to prepare a composition for forming a water repellent layer.

1-6. Preparation of Substrate Layer

The composition for forming a substrate layer was applied on a support (glass substrate) using an applicator, dried at 80° C. for 30 minutes and 100° C. for 1 hour, and cooled to room temperature to prepare a film. Thereafter, a stepwise heat treatment at 180° C. for 120 minutes and 275° C. for 48 minutes (40% of a total heat treatment time) at a heating rate of 20° C./min was performed to prepare a substrate layer having a thickness of 50 µm.

1-7. Preparation of Hard Coating Layer

One surface of the substrate layer prepared above was coated with the composition for forming a hard coating layer using a Mayer bar #10, the composition was dried at 60° C. for 4 minutes and was irradiated with UV at 1000 mJ/cm$^2$ using a high pressure metal lamp to prepare a hard coating layer having a thickness of 5 µm.

1-8. Preparation of Adhesion Reinforcement Layer

The surface of the thus-prepared hard coating layer was corona treated, the hard coating layer was coated with the composition for forming an adhesion reinforcement layer using a Mayer bar #10, and the composition was dried at room temperature for 5 minutes to prepare an adhesion reinforcement layer having a thickness of 30 m.

1-9. Preparation of Low Refractive Layer

The thus-prepared adhesion reinforcement layer was coated with the composition for forming a low refractive layer using a Mayer bar #10, and the composition was dried at 40° C. for 1 minute to prepare a low refractive layer having a thickness of 90 nm.

1-10. Preparation of Water Repellent Layer

The thus-prepared low refractive layer was coated with the composition for forming a water repellent layer using a Mayer bar #14, the composition was dried at 80° C. for 2 minutes, and a heat treatment was performed at 120° C. for 5 minutes to prepare a water repellent layer having a thickness of 30 nm.

Example 2

An optical multilayer structure was manufactured in the same manner as in Example 1, except that the refractive index of each layer was applied as shown in Table 1.

Example 3

An optical multilayer structure further including a hard coating layer on the other surface of the substrate layer of the optical multilayer structure of Example 1 was manufactured, by further performing the step of coating the other surface of the thus-prepared substrate layer with the composition for forming a hard coating layer using a Mayer bar #10, drying the composition at 60° C. for 4 minutes, and irradiating UV thereon at 1000 mJ/cm$^2$ using a high pressure metal lamp to prepare a hard coating layer having a thickness of 5 µm.

Comparative Example 1

An optical multilayer structure was manufactured in the same manner as in Example 1, except that a step of preparing the adhesion reinforcement layer was omitted by preparing the low refractive layer right after preparing the hard coating layer.

Comparative Example 2

An optical multilayer structure was manufactured in the same manner as in Example 1, except that a step of preparing a water repellent layer was omitted after preparing the low refractive layer.

Comparative Example 3

An optical multilayer structure was manufactured in the same manner as in Example 1, except that a step of preparing the low refractive layer was omitted by preparing the water repellent layer right after preparing the adhesion reinforcement layer.

<Experimental Example> Measurement of Physical Properties

Optical multilayer structures manufactured in Examples 1 to 3 and Comparative Examples 1 to 3 were used to measure the physical properties according to 1 to 5 of <Test method>, which are shown in the following Tables 1 and 2.

TABLE 1

|  |  | Example 1 | Example 2 | Example 3 | Comparative Example 1 | Comparative Example 2 | Comparative Example 3 |
|---|---|---|---|---|---|---|---|
| Refractive index | Low refractive layer | 1.448 | 1.452 | 1.448 | 1.448 | 1.448 | — |
|  | Adhesion reinforcement layer | 1.519 | 1.507 | 1.519 | — | 1.519 | 1.519 |
|  | Hard coating layer | 1.523 | 1.529 | 1.523 | 1.523 | 1.523 | 1.523 |
|  | Substrate layer | 1.623 | 1.623 | 1.623 | 1.623 | 1.623 | 1.623 |
| Optical properties | Transmittance (%) | 92.5 | 92.3 | 91.5 | 92.6 | 92.6 | 90.5 |
|  | Reflectance (%) | 2.53 | 2.72 | 2.69 | 2.52 | 2.48 | 4.91 |

TABLE 2

|  |  | Example 1 | Example 2 | Example 3 | Comparative Example 1 | Comparative Example 2 |
|---|---|---|---|---|---|---|
| Water contact angle (°) | initial | 113 | 113 | 113 | 108 | 72 |
|  | after abrasion with rubber stick | 85 | 85 | 93 | 75 | 62 |
| ΔE (%) |  | 19.0 | 24.8 | 17.7 | 30.6 | 42.9 |

In table 2, ΔE is the value of (E0−E1/E0)×100 in which E0 is an initial water contact angle of the water repellent layer and E1 is a water contact angle after surface abrasion of the water repellent layer with rubber stick according to 3 of <Test method>.

As evidenced from Table 1, the optical multilayer structures of Examples 1 and 2 having a structure in which the hard coating layer, the adhesion reinforcement layer, the low refractive layer, and the water repellent layer were laminated on the substrate layer, and the optical multilayer structure of Example 3 having a structure in which the hard coating layer, the adhesion reinforcement layer, the low refractive layer, and the water repellent layer were laminated on the substrate layer and another hard coating layer was laminated on the other surface of the substrate layer all had reflectances of 4% or less, and thus, had improved optical properties, but the optical multilayer structure of Comparative Example 3 including no low refractive layer had a reflectance higher than those of the examples.

In addition, as confirmed from Table 2, the optical multilayer structures of Examples 1 to 3 had high initial water contact angles of the water repellent layer of 105° or more and improved wear resistance, but the optical multilayer structures of Comparative Examples 1 to 2 which did not have the lamination structure of the examples had lower initial water contact angles of the water repellent layer as compared with the examples and poor wear resistance.

The presently disclosed optical multilayer structure includes a hard coating layer, an adhesion reinforcement layer, a low refractive layer, and a water repellent layer on a substrate layer, where the optical multilayer structure according to one embodiment includes a structure in which a hard coating layer, an adhesion reinforcement layer including an alkoxysilane-based compound having a functional group, a low refractive layer including a siloxane-based compound, and a water repellent layer including an alkoxysilane-based compound containing a fluorine atom are laminated on a substrate layer, thereby having both a high wear resistance and a high water contact angle.

Hereinabove, though one embodiment has been described in detail by the preferred examples and experimental examples, the scope of one embodiment is not limited to the specific examples.

What is claimed is:

1. An optical multilayer structure comprising:
   a substrate layer;
   a hard coating layer formed on a first surface of the substrate layer;
   an adhesion reinforcement layer formed on the hard coating layer and includes an alkoxysilane-based compound having one or more functional groups;
   a low refractive layer formed on the adhesion reinforcement layer and includes a siloxane-based compound; and
   a water repellent layer formed on the low refractive layer and includes an alkoxysilane-based compound containing a fluorine atom,
   wherein the optical multilayer structure has a reflectance of 4% or less in accordance with ASTM E1164, and
   wherein the adhesion reinforcement layer is interposed between the hard coating layer and the low refractive layer.

2. The optical multilayer structure of claim 1, wherein the functional group is one or more selected from the group consisting of an amino group, an amide group, a carboxyl group, an ester group, an acryl group, an epoxy group, and an isocyanate group.

3. The optical multilayer structure of claim 1, wherein the alkoxysilane-based compound containing a fluorine atom has a perfluoropolyether group in a molecular main chain and a hydrolyzable reactive group bonded to a silicon atom at an end of the chain.

4. The optical multilayer structure of claim 1, wherein the optical multilayer structure satisfies the following Equation 1:

$$25\% \geq \Delta E = (E0 - E1/E0) \times 100 \quad \text{[Equation 1]}$$

wherein E0 is a water contact angle of the water repellent layer, and E1 is a water contact angle of the water repellent layer after applying a load of 500 g to a Minoan rubber stick having a diameter of 4 mm and rubbing the rubber stick 2000 times reciprocatingly over a distance of 15 mm at a speed of 50 rpm on a surface of the water repellent layer.

5. The optical multilayer structure of claim 1, wherein the water repellent layer has a water contact angle of 105° or more in accordance with ASTM D5946.

6. The optical multilayer structure of claim 1, wherein the hard coating layer includes a condensate of alkoxysilane having an epoxy group.

7. The optical multilayer structure of claim 1, wherein the substrate layer includes a polyimide-based film including a chemical group derived from a fluorine-based aromatic diamine.

8. The optical multilayer structure of claim 1, wherein the substrate layer includes a polyimide-based film including a chemical group derived from a fluorine-based aromatic diamine, a chemical group derived from an aromatic dianhydride, and a chemical group derived from an aromatic diacid dichloride.

9. The optical multilayer structure of claim 1, wherein the hard coating layer has a refractive index of 1.50 to 1.54.

10. The optical multilayer structure of claim 1, wherein the adhesion reinforcement layer has a refractive index of 1.48 to 1.53.

11. The optical multilayer structure of claim 1, wherein the low refractive layer has a refractive index of 1.42 to 1.47.

12. The optical multilayer structure of claim 1, wherein the optical multilayer structure satisfies the following Equation 2:

$$-0.05 \leq nf - n0 \leq 0.15 \quad \text{[Equation 2]}$$

wherein nf is a refractive index of the substrate layer, and n0 is a refractive index of the hard coating layer.

13. A method of manufacturing an optical multilayer structure, the method comprising:
applying a composition for forming a hard coating layer on a first surface of a substrate layer and curing the composition to form a hard coating layer;
applying a composition for forming an adhesion reinforcement layer including an alkoxysilane-based compound having one or more functional groups on the hard coating layer and drying the composition to form an adhesion reinforcement layer;
applying a composition for forming a low refractive layer including a siloxane-based compound on the adhesion reinforcement layer and drying the composition to form a low refractive layer, such that the adhesion reinforcement layer is interposed between the hard coating layer and the low refractive layer; and
applying a composition for forming a water repellent layer including an alkoxysilane-based compound containing a fluorine atom on the low refractive layer and drying the composition to form a water repellent layer.

14. An optical multilayer structure comprising:
a substrate layer;
a hard coating layer formed on a first surface of the substrate layer;
an adhesion reinforcement layer formed on the hard coating layer and includes an alkoxysilane-based compound having one or more functional groups;
a low refractive layer formed on the adhesion reinforcement layer and includes a siloxane-based compound; and
a water repellent layer formed on the low refractive layer and includes an alkoxysilane-based compound containing a fluorine atom,
wherein the optical multilayer structure has a reflectance of 4% or less in accordance with ASTM E1164, and
wherein the optical multilayer structure satisfies the following Equation 3:

$$0.001 \leq n0 - n1 \leq 0.008 \quad \text{[Equation 3]}$$

wherein n0 is a refractive index of the hard coating layer, and n1 is a refractive index of the adhesion reinforcement layer.

15. The optical multilayer structure of claim 1, wherein the optical multilayer structure satisfies the following Equation 4:

$$0.05 \leq n0 - n2 \leq 0.1 \quad \text{[Equation 4]}$$

wherein n0 is a refractive index of the hard coating layer, and n2 is a refractive index of the low refractive layer.

16. A window cover film comprising the optical multilayer structure of claim 1.

17. A flexible display panel comprising the window cover film of claim 16.

18. The optical multilayer structure of claim 1, further comprising: a hard coating layer formed on the second surface of the substrate layer opposite the first surface.

19. The method of manufacturing an optical multilayer structure of claim 13, further comprising: applying the composition for forming a hard coating layer on the other surface of the substrate layer and curing the composition to form a hard coating layer.

20. A flexible optical multilayer device comprising:
a flexible substrate layer;
a hard coating layer formed on a first surface of the substrate layer;
an adhesion reinforcement layer formed on the hard coating layer and includes an alkoxysilane-based compound having one or more functional groups;
a low refractive layer formed on the adhesion reinforcement layer and includes a siloxane-based compound; and
a water repellent layer formed on the low refractive layer and includes an alkoxysilane-based compound containing a fluorine atom,
wherein the flexible substrate layer, the hard coating layer, the adhesion reinforcement layer, the low-reflective adhesion reinforcement layer, and the water repellent layer comprise a laminated structure, and wherein the adhesion reinforcement layer is interposed between the hard coating layer and the low refractive layer.

* * * * *